(12) United States Patent
Peng et al.

(10) Patent No.: US 7,440,294 B2
(45) Date of Patent: Oct. 21, 2008

(54) POWER ADAPTER AND POWER SUPPLY SYSTEM USING THE SAME

(75) Inventors: Yung-Wei Peng, Taoyuan (TW); Chun-Hao Liao, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/691,269

(22) Filed: Mar. 26, 2007

(65) Prior Publication Data
US 2008/0062726 A1    Mar. 13, 2008

(30) Foreign Application Priority Data
Sep. 12, 2006    (TW)    ............................ 95133739 A

(51) Int. Cl.
*H02M 3/335*    (2006.01)
*G05F 1/577*    (2006.01)
(52) U.S. Cl. ................. 363/21.01; 323/267; 363/81
(58) Field of Classification Search ........... 363/16, 363/21.01, 21.06, 21.14, 81, 79, 97; 323/267
See application file for complete search history.

(56) References Cited

U.S. PATENT DOCUMENTS 6,026,000 A * 2/2000 Buijs et al. ............... 363/21.06
6,459,595 B2 * 10/2002 Assow ..................... 363/21.14

* cited by examiner

*Primary Examiner*—Jessica Han

(57) ABSTRACT

The present invention is associated with a power adapter capable of simultaneously providing a low-level DC voltage and a high-level DC voltage. The power adapter includes a transformer having a primary winding for storing energy when a main switch coupled therewith is turned on and transferring the stored energy to the secondary side of the transformer when the main switch is turned off. The transformer includes a first secondary winding and a second secondary winding connected in series with each other. A first rectifier/filter circuit is connected across the first secondary winding for generating a low-level DC voltage by rectifying and filtering the energy received by the first secondary winding, and a second rectifier/filter circuit is connected across the first secondary winding and the second secondary winding for generating a high-level DC voltage by rectifying and filtering the energy received by the first secondary winding and the second secondary winding.

10 Claims, 4 Drawing Sheets

POWER ADAPTER AND POWER SUPPLY SYSTEM USING THE SAME

FIELD OF THE INVENTION

The present invention is related to a power adapter, and more particularly to a power adapter capable of simultaneously providing a low-level DC voltage and a high-level DC voltage for power converters with different specifications to proceed with power conversion operations.

BACKGROUND OF THE INVENTION

FIG. 1 shows a systematic block diagram of a power supply system for a flat panel display according to the prior art. As shown in FIG. 1, a power adapter 100 is configured to receive an input AC voltage Vin and convert the input AC voltage into an output DC voltage Vo. The output DC voltage Vo is provided to a DC-AC converter 101 (or inverter) and a DC-DC converter 102, respectively. The DC-DC converter 102 is configured to convert the output DC voltage Vo into a DC voltage with a lower voltage level for powering the control circuitry (not shown) located within the flat panel display. The DC-AC converter 101 is configured to convert the output DC voltage Vo into a high-frequency high-level AC voltage for illuminating the discharge lamps which functions as the backlight module for the flat panel display.

A typical power adapter for a flat panel display is configured to receive 110-V or 220-V input AC voltage and provide 12-V output DC voltage. Hence, the output DC voltage Vo provided by the power adapter 100 shown in FIG. 1 is generally a low-level DC voltage with the voltage level being 12V. The voltage level of the output DC voltage of the DC-DC converter 102 can be 1.5-V, 2.5-V, 3-V, 3.3-V, 4.5-V, 5-V, 6-V, 7.5-V, 9-V, or 12-V. However, the DC-AC converter 101 generally produces a high-frequency AC voltage as the desired power source for illuminating the discharge lamps located within the flat panel display. Therefore, the DC-AC converter 101 is responsible to convert the output DC voltage Vo having a voltage of 12V into a high-frequency AC voltage.

The DC-AC converter 101 is configured to convert a low-level DC voltage into a high-level DC voltage through the switching operations of the internal switches (not shown) and the voltage boosting operation of the internal high-voltage transformers (not shown). In this case, the voltage transformation ratio of the DC-AC converter 101 will become relatively large. Therefore, the DC-AC converter 101 would cause considerable power loss, which would deteriorate the conversion efficiency of the DC-AC converter 101. If the power adapter 100 can provide an output DC voltage with a higher voltage level for the DC-AC converter 101 to perform voltage transformation, the power loss caused by the DC-AC converter 101 can be reduced and the conversion efficiency of the DC-AC converter 101 can be enhanced.

FIG. 2 is a circuit diagram showing the power adapter 100 of FIG. 1. As shown in FIG. 2, the power adapter 100 includes a bridge rectifier 201 which is configured to rectify an input AC voltage into a full-wave rectified DC voltage and a transformer T21 having a primary winding Np21 and a secondary winding Ns21. The primary winding Np21 is configured to store energy from the input AC voltage Vin when a main switch S21 which is connected in series with the primary winding Np21 is ON and release the stored energy to the secondary winding Ns21 when the main switch S21 is OFF. The switching operations of the switch S21 are manipulated by a pulse-width modulator (PWM) 202. The power adapter 100 further includes a rectifier/filter circuit which is consisted of a rectifying diode D21 and a filtering capacitor C21 and connected to the secondary winding Ns21. The rectifier/filter circuit (D21, C21) is configured to perform rectification and filtration to the energy received by the secondary winding Ns21 so as to generate a desired output DC voltage Vo. The power adapter 100 further includes a feedback control circuit 203 which is configured to detect variations on the output DC voltage Vo and in response thereto issue a feedback signal to the pulse-width modulator 202 to enable the pulse-width modulator 202 to stabilize the output DC voltage Vo at a predetermined level.

As stated above, the output DC voltage Vo of the conventional power adapter 100 is a low-level DC voltage. If this low-level DC voltage Vo is provided to the DC-AC converter 101 shown in FIG. 1 for voltage transformation, the DC-AC converter 101 would cause a considerable power loss and deteriorate the conversion efficiency. Here, it would be an ideal solution to the above drawbacks if a power adapter capable of simultaneously providing a low-level output DC voltage and a high-level output DC voltage is devised. The present invention can satisfy these needs.

SUMMARY OF THE INVENTION

An object of the present invention is to provide a power adapter for simultaneously providing a low-level output DC voltage for voltage transformation and a high-level output DC voltage for voltage transformation.

According to a preferred embodiment of the present invention, a power adapter includes a rectifier for rectifying an input AC voltage into a full-wave rectified DC voltage and a transformer having a primary winding being connected in series with a main switch for storing energy when the main switch is ON and releasing the stored energy to the secondary side of the transformer when the main switch if OFF. The transformer further includes a first secondary winding and a second secondary winding, in which the first secondary winding and the second secondary winding are connected in series with each other. The power adapter further includes a first rectifier/filter circuit connected across the first secondary winding for performing rectification and filtration to the energy received by the first secondary winding and thereby generating a low-level DC voltage, and a second rectifier/filter circuit connected across the first secondary winding and the second secondary winding for performing rectification and filtration to the energy received by the first secondary winding and the second secondary winding and thereby generating a high-level DC voltage.

According to a deeper aspect of the present invention, a power supply system is provided, including a power adapter for simultaneously converting an input AC voltage into a low-level output DC voltage and a high-level output DC voltage, a DC-DC converter connected to the power adapter for receiving the low-level output DC voltage from the power adapter and converting the low-level output DC voltage into a DC voltage, and a DC-AC converter for receiving the high-level output DC voltage from the power adapter and converting the high-level output DC voltage into an output AC voltage. The power adapter includes a switch and a transformer having a primary winding, a first secondary winding and a second secondary winding. The primary winding is connected in series with the switch, and the first secondary winding and the second secondary winding are connected in series with each other. The primary winding is configured to store energy when the switch is ON and release the stored energy to the first secondary winding and the second secondary winding when the switch is OFF. The power adapter further includes a first rectifier/filter circuit connected across the first secondary winding for performing rectification and filtration to the energy received by the first secondary winding and thereby generating a low-level output DC voltage, and a second rectifier/filter circuit connected across the first secondary winding and the second secondary winding for performing rectification and filtration to the energy received by the first secondary winding and the second secondary winding and thereby generating a high-level output DC voltage.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
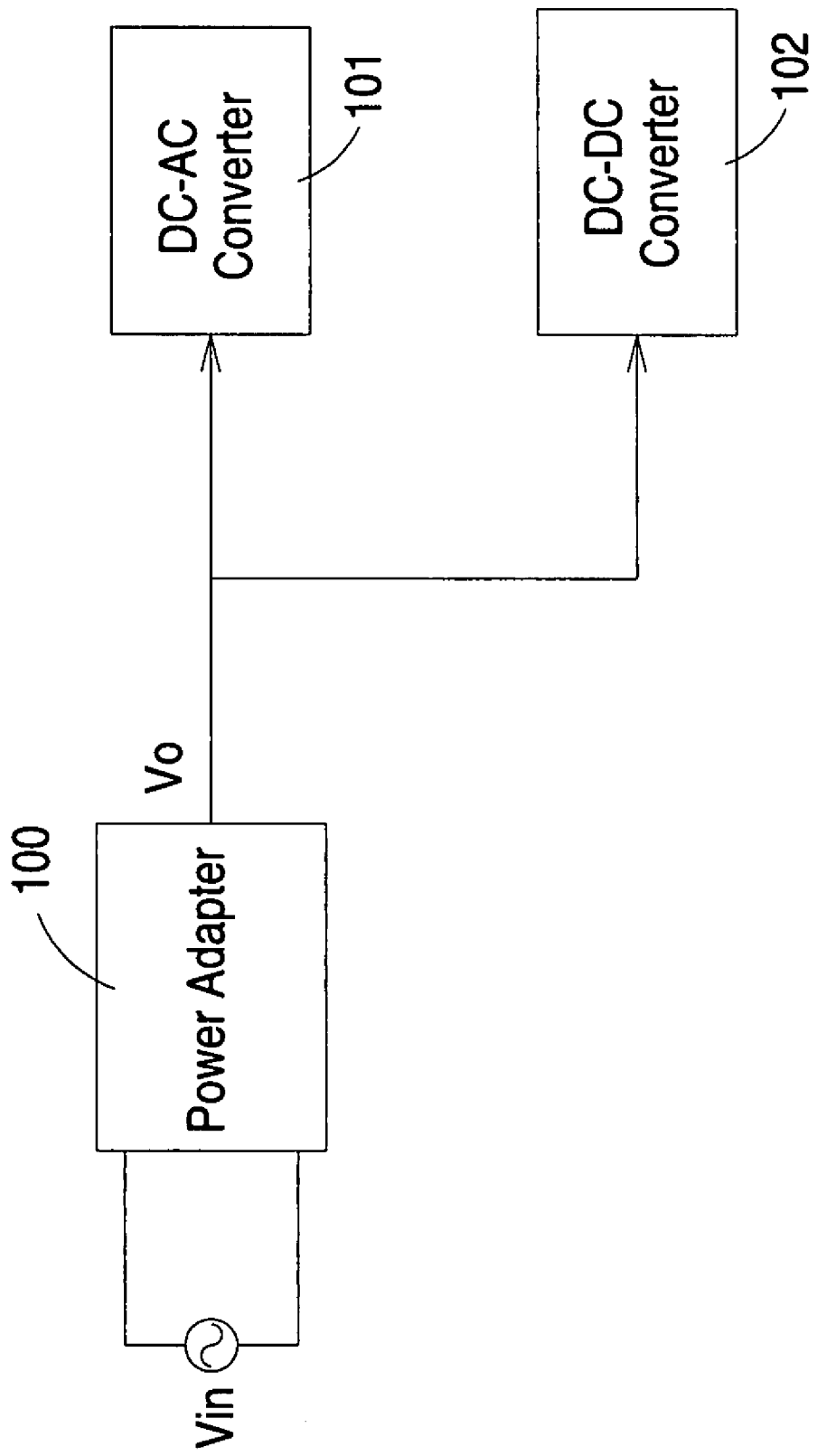
FIG. 1 is a circuit diagram showing a power supply system for a flat panel display according to the prior art.
Figure 2:
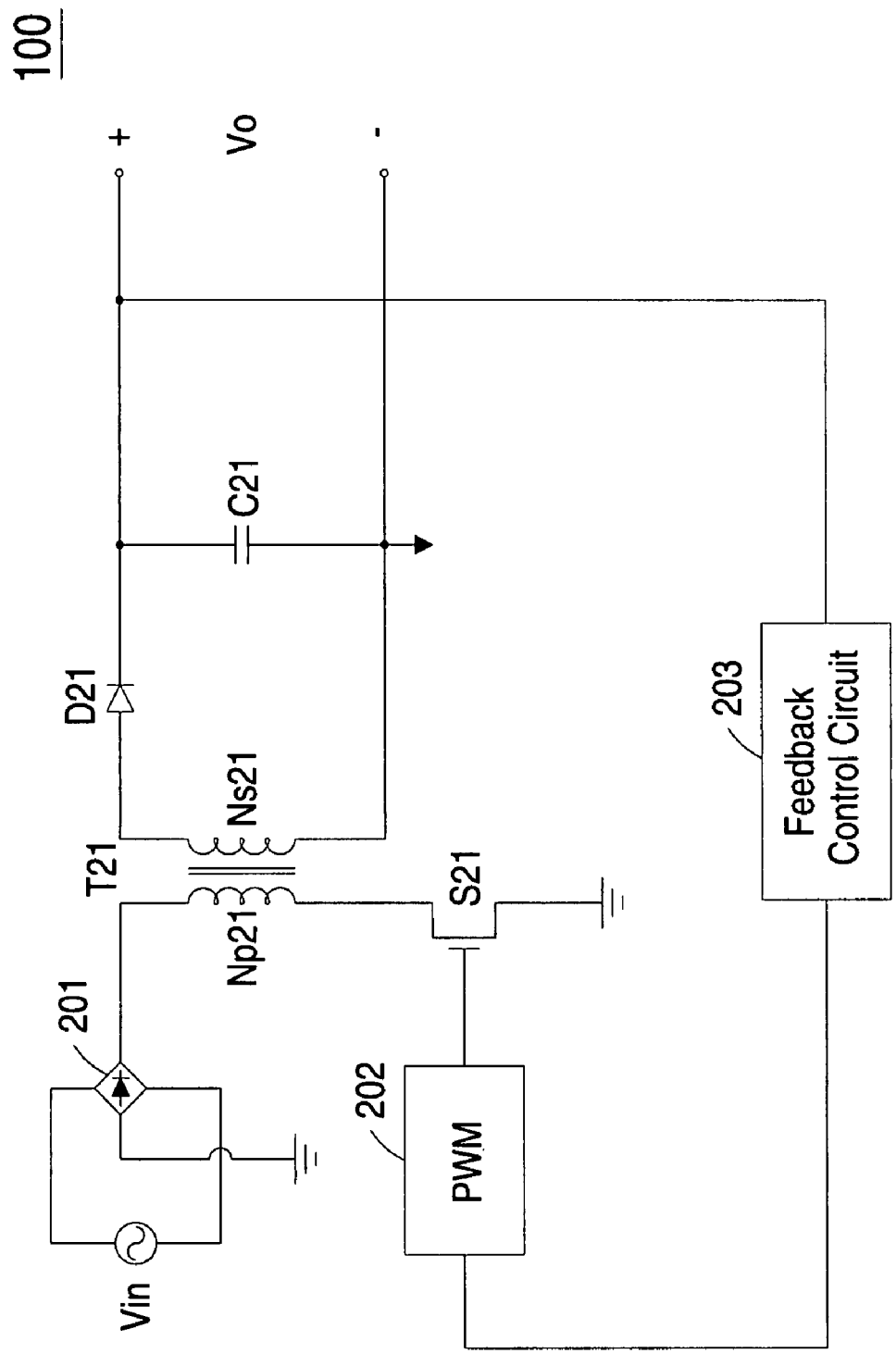
FIG. 2 is a circuit diagram of the power adapter of FIG. 1 according to the prior art.
Figure 3:
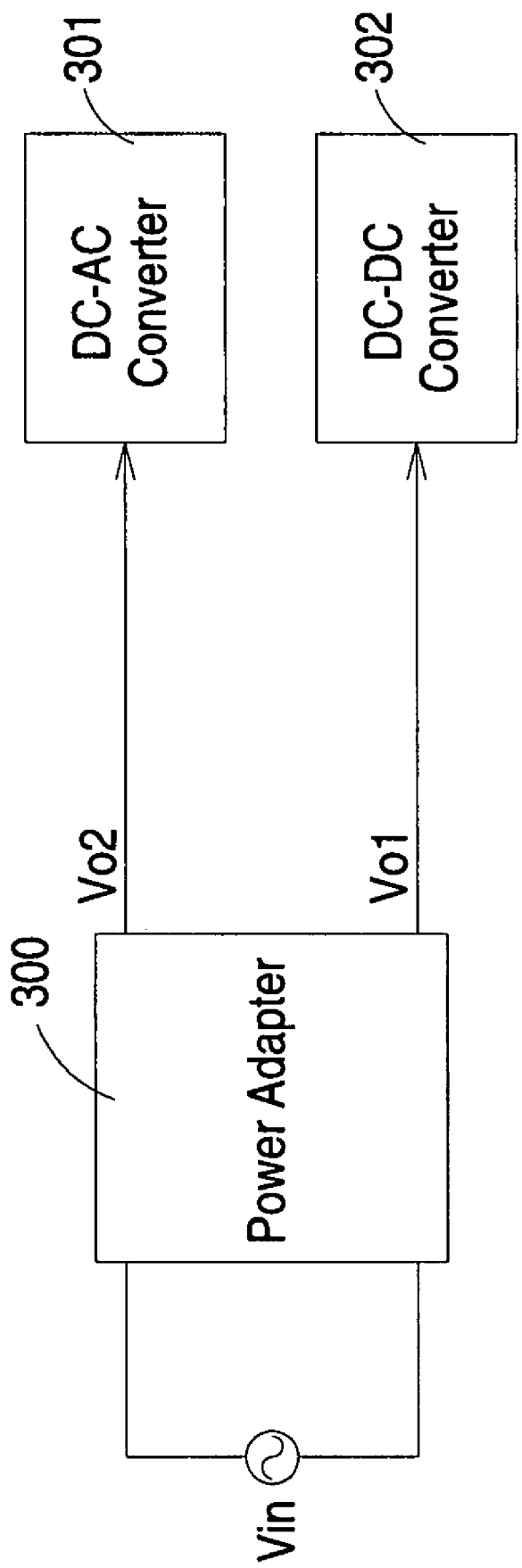
FIG. 3 is a systematic block diagram of a power supply system for a flat panel display according to the present invention.

FIG. 3 shows a power supply system having a power adapter for use with a flat panel display according to the present invention. As shown in FIG. 3, the power adapter 300 is configured to provide a low-level output DC voltage Vo1 for a DC-DC converter 302 to perform voltage transformation. In the meantime, the power adapter can provide a high-level output DC voltage Vo2 for a DC-AC converter 301 to perform voltage transformation. Because the input voltage of the DC-AC converter 301 is a high-level DC voltage, the voltage transformation ratio of the DC-AC converter 301 can be lowered, so that the power loss caused by the DC-AC converter 301 can be reduced and the conversion efficiency of the DC-AC converter 301 can be enhanced.

Figure 4:
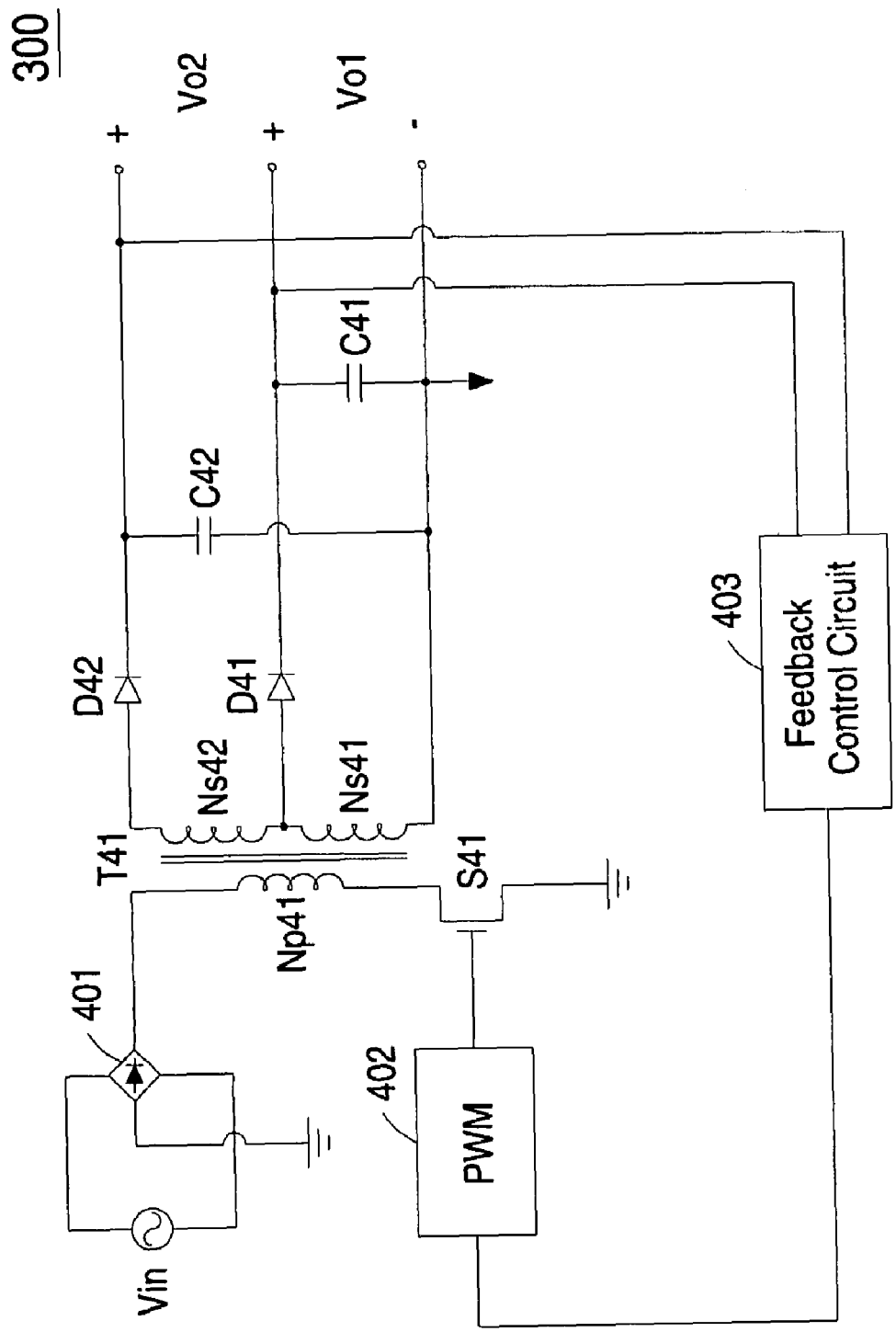
FIG. 4 is a circuit diagram of the power adapter of FIG. 3 according to the present invention.

The circuit diagram of the power adapter according to the present invention is illustrated in FIG. 4. As shown in FIG. 4, the power adapter 300 includes a bridge rectifier 401 which is configured to rectify an input AC voltage Vin into a full-wave rectified DC voltage and a transformer T41 having a primary winding Np41, a first secondary winding Ns41 and a second secondary winding Ns42. The primary winding Np41 is configured to store energy received from the input AC voltage Vin when a main switch S41 which is connected in series with the primary winding Np41 is ON and release the stored energy to the first secondary winding Ns41 and the second secondary winding Ns42 when the main switch S41 is OFF. The switching operations of the main switch S41 is manipulated by the pulse-width modulator 402. The power adapter 300 further includes a first rectifier/filter circuit and a second rectifier/filter circuit, in which the first rectifier/filter circuit is consisted of a rectifying diode D41 and a filtering capacitor C41 and connected across the first secondary winding Ns41, and the second rectifier/filter circuit is consisted of a rectifying diode D42 and a filtering capacitor C42 and connected across the first secondary winding Ns41 and the second secondary winding Ns42. The first rectifier/filter circuit (D41, C41) is configured to perform rectification and filtration to the energy received by the first secondary winding Ns41 to generate a desired low-level output DC voltage Vo1, and the second rectifier/filter circuit (D42, C42) is configured to perform rectification and filtration to the energy received by the first secondary winding Ns41 and the second secondary winding Ns42 to generate a desired high-level output DC voltage Vo2. The power adapter 300 further includes a feedback control circuit 403 which is configured to detect variations on the output DC voltages Vo1 and Vo2 and in response thereto issue a feedback signal to the pulse-width modulator 402 to enable the pulse-width modulator 402 to respectively stabilize the output DC voltages Vo1 and Vo2 at a predetermined level.

As is well know in the art, the voltage level of the output voltage of the power adapter 300 depends on the turn ratio of the transformer. In order to allow the power adapter 300 to provide a higher-level output DC voltage to the DC-AC converter 301 of FIG. 3 for voltage transformation, an additional secondary winding is needed to be mounted on the secondary side of the transformer and connected in series with the inherent secondary winding of the transformer, and an additional rectifier/filter circuit is needed to be connected across the secondary side of the transformer. In this way, the transformer turn ratio selected by the additional rectifier/filter circuit can be maximized. As shown in FIG. 4, the power adapter 300 according to the present invention includes a second secondary winding Ns42 which is connected in series with the intrinsic secondary winding Ns41 as the additional secondary winding, and includes a second rectifier/filter circuit (D42, C42) which is connected across the first secondary winding Ns41 and the second secondary winding Ns42 as the additional rectifier/filter circuit. The input voltage of the second rectifier/filter circuit (D42, C42) depends on the turn ratio between the first and second secondary windings (Ns41, Ns42) and the primary winding Np41. Under this condition, the output DC voltage Vo2 provided by the second rectifier/filter circuit (D42, C42) will have a higher voltage level than the output DC voltage Vo1 provided by the first rectifier/filter circuit (D41, C41).

It is to be noted that the circuit architecture of the first rectifier/filter circuit and the second rectifier/filter circuit is not limited to the form disclosed herein, but can be implemented by other rectifying/filtering elements. For example, the rectifying diode and the filtering capacitor employed in the first rectifier/filter circuit and the second rectifier/filter circuit can be replaced with a power factor correction (PFC) boost converter.

In conclusion, the power adapter according to the present invention is configured to simultaneously output a low-level DC voltage and a high-level DC voltage, and respectively provide the low-level DC voltage and the high-level DC voltage to a DC-DC converter and a DC-AC converter for voltage transformation. In order to allow the power adapter to simultaneously output a low-level DC voltage and a high-level DC voltage, an additional secondary winding is mounted on the secondary side of the transformer and connected in series with the intrinsic secondary winding of the transformer. Also, an additional rectifier/filter circuit is mounted and connected across the intrinsic secondary winding and the additional secondary winding, so that the turn ratio of the transformer selected by the additional rectifier/filter circuit is maximized. Thus, the additional rectifier/filter circuit can generate an output voltage having a voltage level being larger than the voltage level of the output voltage of the intrinsic rectifier/filter circuit. This high-level output DC voltage is provided to the DC-AC converter for voltage transformation. Because the voltage level of the input voltage of the DC-AC converter is increased dramatically, the voltage transformation ratio of the DC-AC converter is lowered and the power loss caused by the DC-AC converter is reduced. Therefore, the conversion efficiency of the DC-AC converter is enhanced.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A power adapter for simultaneously converting an input AC voltage into a low-level output DC voltage and a high-level output DC voltage, comprising:
    a switch;
    a transformer having a primary winding, a first secondary winding and a second secondary winding, wherein the primary winding is connected in series with the switch and the first secondary winding and the second secondary winding are connected in series with each other, the transformer is configured to store energy therein when the switch is turned on and transfer the stored energy to the first secondary winding and the second secondary winding when the switch is turned off;
    a first rectifier/filter circuit connected across the first secondary winding for performing rectification and filtering operation to the energy received by the first secondary winding so as to generate a low-level output DC voltage;
    a second rectifier/filter circuit connected across the first secondary winding and the second secondary winding for performing rectification and filtering operation to the energy received by the first secondary winding and the second secondary winding so as to generate a high-level output DC voltage,
    a pulse-width modulator for controlling switching operations of the switch; and
    a feedback control circuit connected with the first rectifier/filter circuit, the second rectifier/filter circuit and the pulse-width modulator for detecting variations on the low-level output DC voltage and the high-level output DC voltage and in response thereto issuing a feedback signal to the pulse-width modulator to enable the pulse-width modulator to stabilize the low-level output DC voltage at a predetermined level and stabilize the high-level output DC voltage at a predetermined level.

2. The power adapter according to claim 1 further comprising a rectifier for rectifying the input AC voltage into a full-wave rectified DC voltage.

3. The power adapter according to claim 2 wherein the rectifier is a bridge rectifier.

4. The power adapter according to claim 1 wherein the first rectifier/filter circuit comprises a rectifying diode and a filtering capacitor.

5. The power adapter according to claim 1 wherein the second rectifier/filter circuit comprises a rectifying diode and a filtering capacitor.

6. A power supply system comprising:
    a power adapter for simultaneously converting an input AC voltage into a low-level output DC voltage and a high-level output DC voltage, the power adapter comprising:
        a switch;
        a transformer having a primary winding, a first secondary winding and a second secondary winding, wherein the primary winding is connected in series with the switch and the first secondary winding and the second secondary winding are connected in series with each other, and wherein the transformer is configured to store energy in the primary winding when the switch is turned on and release the stored energy from the primary winding to the first secondary winding and the second secondary winding when the switch is turned off;
        a first rectifier/filter circuit connected across the first secondary winding for performing rectification and filtration to the energy received by the first secondary winding so as to generate a low-level output DC voltage;
        a second rectifier/filter circuit connected across the first secondary winding and the second secondary winding for performing rectification and filtration to the energy received by the first secondary winding and the second secondary winding so as to generate a high-level output DC voltage;
        a pulse-width modulator for controlling switching operations of the switch; and
        a feedback control circuit connected with the first rectifier/filter circuit, the second rectifier/filter circuit and the pulse-width modulator for detecting variations on the low-level output DC voltage and the high-level output DC voltage and in response thereto issuing a feedback signal to the pulse-width modulator to enable the pulse-width modulator to stabilize the low-level output DC voltage at a predetermined level and stabilize the high-level output DC voltage at a predetermined level;
    a DC-DC converter connected to the power adapter for receiving the low-level output DC voltage and converting the low-level output DC voltage into an output DC voltage; and
    a DC-AC converter connected to the power adapter for receiving the high-level output DC voltage and converting the high-level output DC voltage into an output AC voltage.

7. The power supply system according to claim 6 wherein the power adapter further comprises a rectifier for rectifying the input AC voltage into a full-wave rectified DC voltage.

8. The power supply system according to claim 7 wherein the rectifier is a bridge rectifier.

9. The power supply system according to claim 6 wherein the first rectifier/filter circuit comprises a rectifying diode and a filtering capacitor.

10. The power supply system according to claim 6 wherein the second rectifier/filter circuit comprises a rectifying diode and a filtering capacitor.

* * * * *